(12) United States Patent
Farrugia et al.

(10) Patent No.: US 8,687,803 B2
(45) Date of Patent: Apr. 1, 2014

(54) OPERATIONAL MODE FOR BLOCK CIPHERS

(75) Inventors: Augustin J. Farrugia, Cupertino, CA (US); Benoit Chevallier-Mames, Paris (FR); Melanie Riendeau, Campbell, CA (US); Mathieu Ciet, Paris (FR); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 13/232,769

(22) Filed: Sep. 14, 2011

(65) Prior Publication Data

US 2013/0067211 A1     Mar. 14, 2013

(51) Int. Cl.
*H04L 29/06*     (2006.01)

(52) U.S. Cl.
USPC ............... 380/37; 380/42; 380/28; 380/255; 713/150; 713/153; 713/189

(58) Field of Classification Search
None
See application file for complete search history.

(56) References Cited

U.S. PATENT DOCUMENTS

| | | | |
|---|---|---|---|
| 5,684,876 A * | 11/1997 | Pinder et al. | 380/37 |
| 6,226,742 B1 * | 5/2001 | Jakubowski et al. | 713/170 |
| 7,450,717 B1 * | 11/2008 | Sprunk et al. | 380/37 |
| 8,533,483 B2 * | 9/2013 | Izu et al. | 713/180 |
| 2001/0046296 A1 * | 11/2001 | Katayanagi et al. | 380/210 |
| 2003/0070081 A1 * | 4/2003 | Wee et al. | 713/189 |
| 2007/0245147 A1 * | 10/2007 | Okeya | 713/181 |
| 2008/0192924 A1 * | 8/2008 | Shang | 380/28 |
| 2009/0147950 A1 * | 6/2009 | Yoon | 380/44 |

* cited by examiner

*Primary Examiner* — Fikremariam A Yalew
*Assistant Examiner* — Kendall Dolly
(74) *Attorney, Agent, or Firm* — Blakely, Sokoloff, Taylor & Zafman LLP

(57) ABSTRACT

In the field of computer enabled cryptography, such as a keyed block cipher having a plurality of sequenced rounds, the cipher is hardened against attack by a protection process. The protection process uses block lengths that are larger or smaller than and not an integer multiple of those of an associated standard cipher, and without using message padding. This is operative in conjunction with standard block ciphers such as the AES, DES or triple DES ciphers, and also with various block cipher cryptographic modes such as CBC or EBC.

10 Claims, 4 Drawing Sheets

OPERATIONAL MODE FOR BLOCK CIPHERS

FIELD OF THE INVENTION

This disclosure relates to cryptography and block ciphers.

BACKGROUND

A block cipher (unlike a stream cipher) is designed to encrypt a given amount (length) of data in one pass of the cipher: the so-called block size. When a message having more data than the defined block size is to be encrypted, various known modes of cryptographic operation may be used in addition to the straightforward approach of just partitioning the message into blocks and encrypting each block while padding the last block with null characters to achieve the defined block size. Classical modes of operation used with block ciphers are CBC (cipher-block chaining), ECB (electronic codebook), etc. They enable one encrypt or decrypt a message of any length using any block cipher. This is done using such padding: if a message has a size that is not an integer multiple of the block cipher block size (see FIG. 1, top), prior to encryption, a set of padding (e.g., null) bits is concatenated to the message (see FIG. 1, middle), to finally obtain a message length which is an integer multiple of the block size (see FIG. 1, bottom). This padded message is then encrypted. The padding bits are removed after decryption. While this is the standard method, it has a major drawback in the case of encryption (or decryption) obfuscation: the padded message to be encrypted (decrypted) always has the property that its size is a multiple of the standard cipher block size, see FIG. 1, bottom. This property greatly helps an attacker to understand the associated cipher as expressed in computer code: for instance with the AES cipher, the attacker knows the message size is a multiple of the 16 bytes block size when he wants to find input/output blocks of the AES state.

The AES cipher is approved as an encryption standard by the U.S. Government. Unlike its predecessor DES (Data Encryption Standard) or the triple DES cipher, it is a substitution permutation network (SPN). AES is fast to execute in both computer software and hardware implementation, relatively easy to implement, and requires little memory. AES has a fixed block size of 128 (16B) bits and a key size of 128, 192 or 256 bits. Due to the fixed block size of 128 bits, AES operates on a 4×4 array of the 16 bytes. It uses key expansion and like most block ciphers a set of encryption and decryption rounds (iterations). Block ciphers of this type include in each round use of substitution boxes (S-boxes). This operation provides non-linearity in the cipher and significantly enhances security.

Note that these block ciphers are symmetric ciphers, meaning the same key is used for encryption and decryption. As is typical in most modern ciphers, security rests with the (secret) key rather than the algorithm. The S-boxes accept an n-bit input and provide an m-bit output. The values of m and n vary with the cipher and the S-box itself. The input bits specify an entry in the S-box in a particular manner well known in the field.

SUMMARY

This disclosure is of ways to encrypt data using a block which is of a size not a multiple of the specified block cipher block length. In the AES cipher case, this enables one to encrypt and/or decrypt with a block (buffer) of other than the standard 16B block size multiple.

In a first embodiment, the mode is modified in order to encrypt a message of lengths that are multiples of a fixed block size greater than the original cipher block size. A second embodiment does that for multiples of a fixed block size smaller than the original cipher block size. This disclosure thus presents ways to augment and diminish the block encryption size. As a result, the message size need not be a multiple of the original (base) cipher block length, enhancing cipher security. The methods are extendable to other modes of operation, for instance CBC-MAC.

The present method is not limited in terms of the internal/original (base) cipher used. This is DES, AES or any encryption algorithm, and is also in decryption modes.

The advantages are numerous. For instance, these methods do not require any message padding, and harden against reverse engineering of the associated computer code.

DETAILED DESCRIPTION

AES Description

Figure 1:
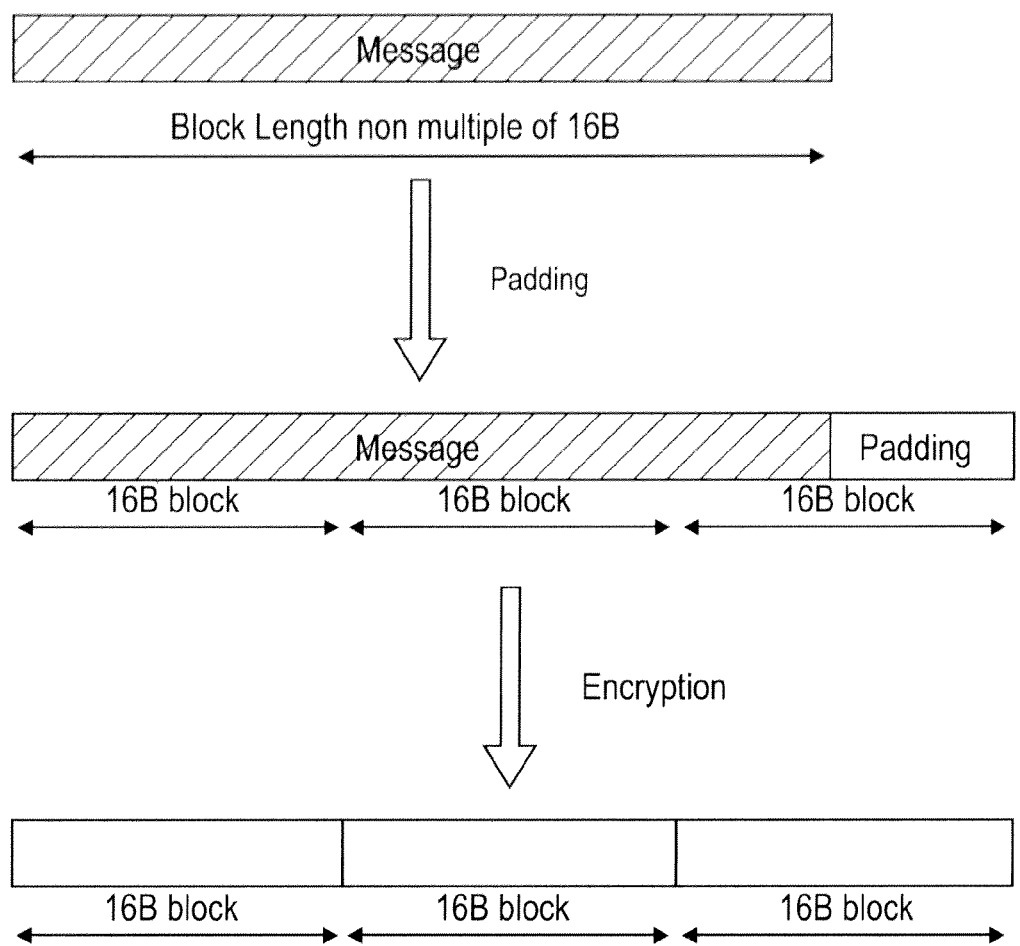
FIG. 1 shows, in the prior art, cipher blocks and padding.

See the NIST AES standard for a more detailed description of the AES cipher: Specification for the ADVANCED ENCRYPTION STANDARD (AES), NIST, http://csrc.nist-.gov/publications/fips/fips197/fips-197.pdf. The following is a summary of the well known AES cipher. The AES cipher uses a 16 byte cipher key, and has 10 rounds (final found plus 9 others). The AES encryption algorithm has the following operations as depicted graphically in prior art FIG. 1 and showing round zero of the 9 rounds:

11 AddRoundKey Operations
10 SubByte Operations
10 ShiftRow Operations
9 MixColumn Operations AES is computed using a 16-byte buffer (computer memory) referred to as the AES "state" in this disclosure and shown in FIG. 1.

To summarize,
(i) AddRoundKeys (ARK) logically XOR (the Boolean exclusive OR operation) some sub-key bytes with the state bytes.
(ii) ShiftRows (SR) are a move from one byte location to another.
(iii) MixColums (MC) are a linear table-look up (TLU), applied to 4 bytes.
(iv) SubBytes (SB) are a non-linear TLU, applied to 1 byte.

Figure 2:
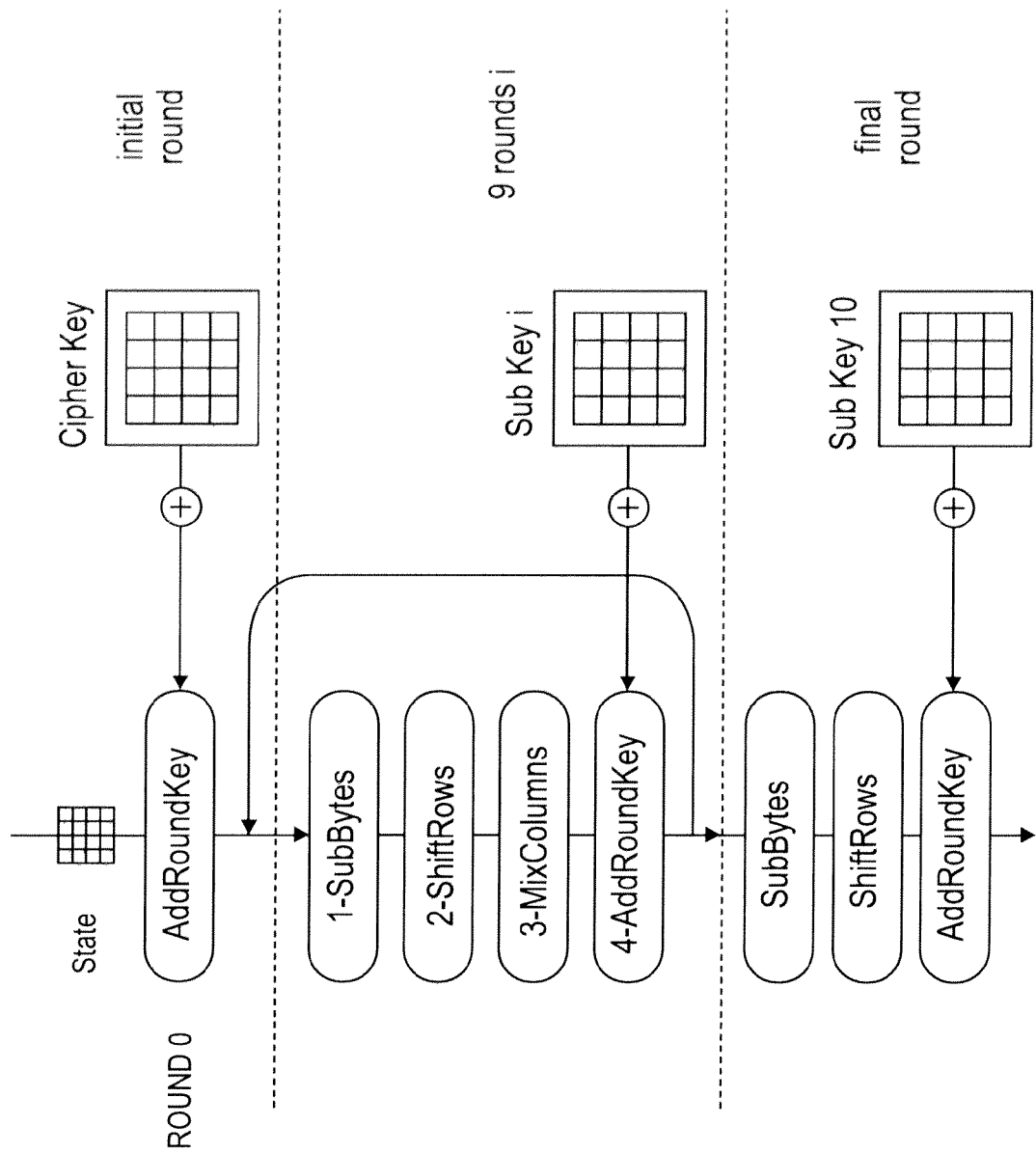
FIG. 2 shows, in the prior art, AES encryption.

Preliminarily to the encryption itself, in the initial round in FIG. 2, the original 16-byte cipher key is expanded to 11 sub-keys (also called subkeys or round keys) designated K0, ..., K10 so there is a sub-key for each round, during what is called the key-schedule. Each sub-key, like the original cipher key, is 16-bytes long.

The following explains AES decryption round by round. For the corresponding encryption (see FIG. 2), one generally performs the inverse of each operation, in the inverse order. (The same is true for the cryptographic processes in accordance with the invention as set forth below.) The inverse operation of ARK is ARK itself, the inverse operation of SB is the inverse subbyte (ISB) which is basically another TLU, the inverse operation of MC is the inverse mix column (IMC) which is basically another TLU, and the inverse operation of SR is the inverse shift row (ISR) which is another move from one byte location to another.

Expressed schematically, AES decryption round-by-round is as follows:

| |
|---|
| ARK (K10) |
| ISR |
| ISB |
| ARK (K9) |
| IMC |
| ISR |
| ISB |
| ARK (K8) |
| IMC |
| ISR |
| ISB |
| ARK (K7) |
| IMC |
| ISR |
| ISB |
| ARK (K6) |
| IMC |
| ISR |
| ISB |
| ARK (K5) |
| IMC |
| ISR |
| ISB |
| ARK (K4) |
| IMC |
| ISR |
| ISB |
| ARK (K3) |
| IMC |
| ISR |
| ISB |
| ARK (K2) |
| IMC |
| ISR |
| ISB |
| ARK (K1) |
| IMC |
| ISR |
| ISB |
| ARK (K0) |

The method in accordance with the invention also can easily be applied to other variants of AES with more rounds (the 192 and 256-bit key length versions even with a 128 bit block size) as well as to other block ciphers and other block based cryptographic processes.

Mode of Operation to Augment the Block Size of a Block Cipher

In this embodiment, an intermediate block cipher based on the original (conventional) block cipher is created having the desired non-standard block size (length). One then uses well known modes with this intermediate block cipher to encrypt the message. Use of the intermediate clock cipher in classical modes thus defines new operational modes to use the original (conventional) block cipher such as AES.

How to Augment the Block Size of a Block Cipher

Let BS designate the conventional (fixed) block size of a standard block cipher (where BS=16B for the AES cipher) and let BSA designate the block size that is "augmented" (longer than the standard fixed block size and not necessarily an integer multiple of the fixed block size) that one wants to achieve.

Using Euclidean division, there uniquely exists integers designated k and r where k>0 and BS>r≥0 such that:

$$BSA = k*BS + r$$

This implies that a buffer (an augmented block) of size BSA can be divided in k blocks, each of size BS plus a possible remainder block of size r. For example, one may create a cipher whose augmented block length is BSA=33 Bytes, using the AES cipher whose BS=16 Bytes. Then k=2 and r=1.

First Implementation

One decomposes a block of data designated BA of block size BSA as follows into a plurality of shorter blocks:

$$BA = (B_1, B_2, \ldots, B_{k-1}, B_k, C)$$

with $B_1, B_2, \ldots, B_k$ designating k blocks each of size BS, and C designating a remainder block of size r. To encrypt (or decrypt) message BA, BA' is computed (where E denotes the block cipher encryption algorithm) as follows:

$$BA' = (E(B_1), \ldots, E(Bk), C)$$

The next step decomposes $E(B_k)$ as:

$$E(B_k) = (B'_{k\_1}, B'_{k\_2})$$

where $B'_{k\_1}, B'_{k\_2}$ is the decomposition of $E(B_k)$ which is the encrypted form of the last full length block, into two blocks of respectively size r and (BS−r). Rewriting BA', this leads to $$BA' = (E(B_1), \ldots, E(B_{k-1}), B'_{k\_1}, B'_{k\_2}, C)$$

This returns:

$$EA(BA) = (E(B_1), \ldots, E(B_{k-1}), B'_{k\_1}, E(B'_{k\_2}, C))$$

as the return of the size-augmented block cipher (designated EA). Hence all the blocks have been enciphered and no "clear" data is leaked because now block C is also encrypted by this last encryption step. The corresponding decryption process (denoted DA) is similar but complementary. Execution of both the encryption and decryption processes is expressed as follows in pseudo code (which is a non-executable depiction of computer source code) as:

---

Algorithm: Encryption
Input: BA
Output: EA(BA)

Decompose BA:
  BA = (B1, B2, ..., Bk−1, Bk, C)
Compute BA':
  BA' = (E(B1), ..., E(Bk), C)
Decompose BA':
  BA' = (E(B1), ..., B'k__1, B'k__2, C)
Compute EA(BA) from BA':
  EA(BA) = (E(B1), ..., B'k__1, E(B'k__2, C))

---

Algorithm: Decryption
Input: BA
Output: DA(BA)

Decompose BA:
  BA = (B1, B2, ..., Bk−2, B'k−1, F); F has size BS and B'k−1 has size r.
Compute BA':
  BA' = (B1, ..., B'k__1, D(F)); D is the original decryption algorithm.
Decompose BA':
  BA' = (B1, ..., Bk, C)
Compute DA(BA):
  DA(BA)' = (D(B1), ..., D(Bk), C)

Second Implementation

As above, decompose augmented block BA into a plurality of shorter blocks:

$$BA=(B_1,B_2,\ldots,B_{k-1},B_k,C)$$

One then applies the cipher encryption algorithm. This leads to:

$$BA'=(E(B_1),E(B_2),E(B_{k-1}),E(B_k),C)$$

One then decomposes encrypted block BA' into:

$$BA'=(C',B'_1,B'_2,B'_{k-1},B'_k)$$

where the first block designated C', is of size r and includes whatever data does not fit into the other blocks, where the other blocks $B'_i$ are each of size BS. One then computes in a second encryption step (without encrypting C' here):

$$EA(BA)=(C',E(B'_1),E(B'_2),\ldots,E(B'_{k-1}),E(B'_k))$$

The following expresses this method in pseudo code for encryption and decryption as:

---

Algorithm: Encryption
Input BA
Output EA(BA)

---

Decompose BA:
    BA = (B1, B2, ..., Bk–1, Bk, C)
Compute BA':
    BA' = (E(B1), ..., E(Bk), C)
Decompose BA':
    BA' = (C', B'1, B'2, ..., B'k–1, B'k)
Compute EA(BA) from BA':
    EA(BA) = (C', E(B'1), E(B'2), ..., E(B'k–1), E(B'k))

---

Algorithm: Decryption
Input BA
Output DA(BA)

---

Decompose BA:
    BA = (C, B1, B2, ..., Bk–1, Bk)
Compute BA':
    BA' = (C, D(B1), ..., D(Bk))
Decompose BA':
    BA' = (B'1, B'2, ..., B'k–1, B'k, C')
Compute DA(BA) from BA':
    DA(BA) = (D(B'1), D(B'2), ..., D(B'k–1), D(B'k), C')

---

This second implementation thus requires 2*k applications of the original block cipher, while the first only requires k+1 applications. So, the second for some situations as a result is much slower to execute than is the first. However, the second ensures a closer link between the encrypted blocks, which enhances security. Furthermore, the second may be implemented in a non-sequential way to improve speed of execution. This means that the computation of (C', E(B'$_1$), E(B'$_2$), . . . , E(B'$_{k-1}$), E(B'$_k$)) may start before the end of the computation of BA'=(E(B$_1$), . . . , E(B'$_k$), C). This is advantageous for parallelized computation, especially if using dedicated encryption/decryption hardware (circuitry) rather than a general purpose computer.

Third Implementation

It is possible to apply the first implementation (one level of encryption, then create a last block of size BS, and encrypt it), but instead of creating the last block having the remainder of the data at the end of the message, create this block at the beginning of the message. The pseudo code for this is:

---

Algorithm: Encryption
Input BA
Output EA(BA)

---

Decompose BA:
    BA = (C'', B1, B2, ..., Bk–1, Bk), where C'' length is r and Bi is length BS
Compute BA':
    BA' = (C'', E(B1), ..., E(Bk))
Decompose BA':
    BA' = (C'', B'1, B'2, E(B2), ..., E(Bk)), where B'1 length is (BS–r)
Compute EA(BA) from BA':
    EA(BA) = (E(C'',B'1), B'2, E(B2), ..., E(Bk))

---

Algorithm: Decryption
Input BA
Output DA(BA)

---

Decompose BA:
    BA = (F,X), where F length is BS
Compute BA':
    BA' = (D(F), X)
Decompose BA':
    BA' = (C'', B'1, ..., B'k–1, B'k)
Compute DA(BA) from BA':
    DA(BA) = (C'', D(B'1), D(B'2), ..., D(B'k–1), D(B'k))

---

Performance for this implementation is equivalent to that of the first implementation.

Using the Augmented Block Size

The above defines three ways to augment the standard cipher block size BS to be instead BSA. This can be used in a classical cipher mode of operation such as ECB or CBC. In the CBC case, the initialization or initial vector (IV) must be of the same size as the BSA block size. So the update here is done as in the classical CBC method, but with larger block size (which is the BSA size). Note that the use of an IV generally is conventional in CBC mode. IV is a block of random data added at the beginning of the message before encryption. It makes each message unique, to enhance security. It may be a timestamp, for example.

Internal CBC

It is possible to have an "internal" CBC mode, requiring a specific length of the IV. "Internal" here means that one applies IV in the base block cipher, of block size BS. Consider the internal (standard or base) block cipher. Let IV be the IV of size equal to the internal (base or standard) cipher block size. All complete blocks of the message are encrypted classically as in conventional CBC mode. The last (short) block to be encrypted is constructed from the rightmost (or leftmost0 part of the message, with an original block cipher size. The IV for that last block is constructed from the previous block of a size that is of the original block cipher size.

This process is expressed in pseudo code (including an explanatory comment and using the usual symbolic notation for the logical XOR operation to logically combine the IV with a block) as:

```
Algorithm: Encryption with internal CBC
        Input: BA, IV
        Output: EA(BA)

Decompose BA:
    BA = (B1, B2, ..., Bk−1, Bk, C)
Compute BA':
    BA' (E(B1⊕IV), ..., E (Bk⊕BA'_k−1), C)
    /* "BA'_k−1" corresponds to the (k−1)th encrypted block */
Decompose BA':
    BA' = (E(B1⊕IV), ..., B'k_1, B'k_2, C)
Compute EA(BA) from BA':
    EA(BA) = (E(B1⊕IV), ..., B'k_1, E((B'k_2,C)⊕(B'k_1,0)))
```

The corresponding decryption process is apparent from this.

This applies the concept of internal CBC mode to the above first implementation. Internal CBC mode can be easily extended to the above second and third implementations. Note that in all the cases in other embodiments the internal CBC mode ciphertext can be decrypted from the right to the left (last block to first block) instead of from the left to the right (first block to last block), as in the classical CBC mode case.

Mode to Diminish the Block Size of a Block Cipher

This embodiment encrypts (or decrypts) a message that also has a length not a multiple of the standard block size BS, using a diminished block size that is smaller than the standard block size BS and again without padding the message. One can also use this in a chained mode such as the CBC mode.

How to Diminish the Block Size of a Block Cipher

Let BSD designate the desired diminished block size which here is smaller (less) than BS, the fixed size of the block of the base block cipher. One computes the Euclidean division with k>0 and r, BSD>r>0:

$$BS = k*BSD + r$$

E.g., one creates a "tiny" cipher of BSD=3 Bytes from a standard AES cipher (where BS=16 Bytes), with k=5 and r=1.

Assume that a message designated S of size (T*BSD) is being encrypted in "pseudo" CBC mode, with T being an integer and T>k. The fact that T>k, which is equivalent to T*BSD>BS, is a requirement for this mode.

The message S is decomposed into a plurality of blocks as:

$$S = (B_1, BS_1, BS_2, \ldots, BS_{T-k-1}, C)$$

where block $B_1$ has the standard fixed block size BS, blocks $BS_1$ up to $BS_{T-k-1}$ each have the diminished block size BSD and the last block C has a size BSD−r. (Note that the notation $BS_i$ here does not refer to the standard block size BS referred to above. In this embodiment, the blocks designated $BS_1$, $BS_2$, etc. are each of the diminished block size BSD.) Indeed, algebraically this results in the following length computation for the message: BS+(T−k−1)*BSD+r=k*BSD+r+(T−k−1)*BSD+BSD−r=T*BSD.

Then encrypt the first block only, to compute:

$$S_1 = (E(B_1), BS_1, BS_2, \ldots, BS_{T-k-1}, C)$$

and decompose $S_1$ as:

$$S_1 = (BS'_1, B_2, BS_2, \ldots, BS_{T-k-1}, C)$$

where:

$$(E(B_1), BS_1) = (BS'_1, B_2)$$

with block $B_2$ of size BS and block $BS'_1$ of size BSD. One then continues the process, and hence computes:

$$S_2 = (BS'_1, E(B_2), BS_2, BS_3, \ldots, BS_{T-k-1}, C)$$

Then rewrite S2 as:

$$S_2 = (BS'_1, BS'_2, B_3, BS_3, \ldots, BS_{T-k-1}, C)$$

and so on, up to obtaining $S_{T-k-1}$ as:

$$S_{T-k-1} = (BS'_1, BS'_2, \ldots, BS_{T-k-2}, E(B_{T-k-1}), C)$$

Note that (E($B_{T-k-1}$), C) has length BS+BSD−r. One can rewrite this as:

$$S_{T-k-1} = (BS'_1, BS'_2, \ldots, BS_{T-k-2}, C', B_{T-k})$$

where block C' is of size BSD−r and block $B_{T-k}$ is of size BS. Note that block C' is already encrypted in an earlier step.

Then compute:

$$ED(S) = (BS'_1, BS'_2, \ldots, BS_{T-k-2}, C', E(B_{T-k}))$$

This results in a solution to encipher a message of size T*BSD with (T−k+1) calls to (executions of) the original block cipher.

This is expressed in pseudo code as:

```
Algorithm: Encryption
Input S of size T.BSD
    Output ED(S)

Decompose S:
    S0 = (B1, BS2, ..., BST−k−2, BST−k−1, C)
For i from 1 to T−k−2
    Compute Si from Si−1:
        Si = (BS'1, ..., BS'i−1, E(Bi), BSi, ..., BST−k−1, C)
    Rewrite Si:
        Si = (BS'1, ..., BS'i−1, BS'i, Bi+1, ..., BST−k−1, C)
end for
Compute ST−k−1 from ST−k−2:
    ST−k−1 = (BS'1, BS'2, ..., BST−k−2, E(BT−k−1), C)
Rewrite ST−k−1:
    ST−k−1 = (BS'1, BS'2, ..., BST−k−2, C', BT−k)
Compute ED(S) from ST−k−1
    ED (S) = (BS'1, BS'2, ..., BST−k−2, C', E(BT−k))
```

```
Algorithm: Decryption
Input S of size T.BSD
    Output DD(S)

Decompose S:
    S = (BS1, BS2, ..., BST−k−2, C, BT−k)
Compute ST−k−1:
    ST−k−1 = (BS1, BS2, ..., BST−k−2, C, D(BT−k))
Rewrite ST−k−1:
    ST−k−1 = (BS1, BS2, ..., BST−k−2, BT−k−1, C')
For i from T−k−2 to 1
    Compute Si from Si+1:
        Si = (BS1, ..., BSi−1, D(Bi), BS'i, ..., BS'T−k−1, C')
    Rewrite Si:
        Si = (BS1, ..., Bi−1, BS'i−1, BS'i, ..., BS'T−k−1, C')
end for
```

Chained Mode for the Diminished Block Size

The goal here is similar to the classical CBC mode, when the CBC mode is implemented for a BSD block size cipher. Note that in the classical CBC mode the IV as the same size as that of the block cipher. The following uses the same notation as above. Let IV (initial value or vector) be a BSD length vector. Since message $S = (B_1, BS_2, \ldots, BS_{k-1}, BS_k, C)$, block B1 has a size BS and thus can be rewritten as:

$$B1 = B1\_BSD, BF_1$$

where block $B1\_{BSD}$ has size BSD and block $BF_1$ has size (BS−BSD).

Define SIV as:

$$SIV = (B1\_BSD \oplus IV, BF_1, BS_2, \ldots, BS_{k-1}, BS_k, C)$$

One then encrypts the first block of SW as:

$$SIV' = (E(B1\_BSD \oplus IV, BF_1), BS_2, \ldots, BS_{k-1}, BS_k, C)$$

This block can be decomposed into SW":

$$SIV'' = (BS'_1, B_2, BS_2, \ldots, BS_{T-k-1}, C),$$

where block B2 has size BS (playing the role of B1 with the second constructed block). Roughly speaking, one encrypts BS bytes, but shifts (a pointer update from a computer code implementation point of view) by BSD bytes. This is because one can consider a message as a table of words that is being accessed. One can also consider the addressing of this table as defining a pointer. Then moving of one block is obtained by adding to the pointer a value to get the basis of the next element in the table. Hence the pointer is updated by adding to it the value of BSD.

From this decomposition, define the new IV as $BS'_1$. This can be repeated until the last block.

For the last block:

$$S_{T-k-1} = (BS'_1, BS'_2, \ldots, BS_{T-k-2}, E(B_{T-k-1}), C)$$

decomposed as:

$$S_{T-k-1} = (BS'_1, BS'_2, \ldots, BS_{T-k-2}, C', B_{T-k})$$

The IV is here chosen as:

$$IV = C' \| 0$$

where II means the concatenation operation and 0 represents the zero (null) vector over (BSD−r) bytes. This is expressed in the following pseudo code:

```
Algorithm: Encryption
Input S of size T.BSD, IV
Output ED(S)

Decompose S:
    S = (B1_BSD, BF1, BS2, ..., BST-k-2, BST-k-1, C)
Compute S0:
    S0 = (B1_BSD ⊕ IV, BF1, BS2, ..., BST-k-2, BST-k-1, C)
For i from 1 to T-k-2
    Compute Si from Si-1:
        Si = (BS'1, ..., BS'i-1, E(Bi), BSi, ..., BST-k-1, C)
    Rewrite Si:
        Si = (BS'1, ..., BS'i-1, BS'i, Bi+1, ..., BST-k-1, C)
    Update IV:
        IV = BS'i
    Update Bi+1:
        Bi+1 = Bi+1_BSD ⊕ IV, BFi+1
end for
Compute ST-k-1 from ST-k-2:
    ST-k-1 = (BS'1, BS'2, ..., BST-k-2, E(BT-k-1), C)
Rewrite ST-k-1:
    ST-k-1 = (BS'1, BS'2, ..., BST-k-2, C', BT-k)
Update IV:
    IV = C' || 0
Update BT-k:
    BT-k = BT-k_BSD ⊕ IV, BFT-k
Compute ED(S) from ST-k-1
    ED(S) = (BS'1, BS'2, ..., BST-k-2, C', E(BT-k))
```

```
Algorithm: Decryption
Input S of size T.BSD, IVin
Output DD(S)

Decompose S:
    S = (BS1, BS2, ..., BST-k-2, C, BT-k)
Compute ST-k-1:
    ST-k-1 = (BS1, BS2, ..., BST-k-2, C, D(BT-k))
             (= (BS1, BS2, ..., BST-k-2, C, B'T-k))
```

```
Algorithm: Decryption
Input S of size T.BSD, IVin
Output DD(S)

Set the IV:
    IV = C || 0
Update B'T-k:
    B'T-k = B'T-k_BSD ⊕ IV || B'FT-k
Rewrite ST-k-1:
    ST-k-1 = (BS1, BS2, ..., BST-k-2, BT-k-1, C')
For i from T-k-2 to 1
    Compute Si from Si+1:
        Si = (BS1, ..., BSi-1, D(Bi), BS'i, ..., BS'T-k-1, C')
           (= (BS1, ..., BSi-1, B'i, BS'i, ..., BS'T-k-1, C'))
    if (i != 1)
        Update IV:
            IV = BSi-1
    else
        Update IV:
            IV = IVin
    endif
    Update B'i:
        B'i = B'i_BSD ⊕ IV, B'Fi
    Rewrite Si:
        Si = (BS1, ..., Bi-1, BS'i-1, BS'i, ..., BS'T-k-1, C')
end for
```

The above descriptions are all in terms of data in Byte (8 bits) size, but this may alternatively be in bit or word (the word being of any convenient length in terms of bits) size, and all these methods would still be operative.

Figure 3:
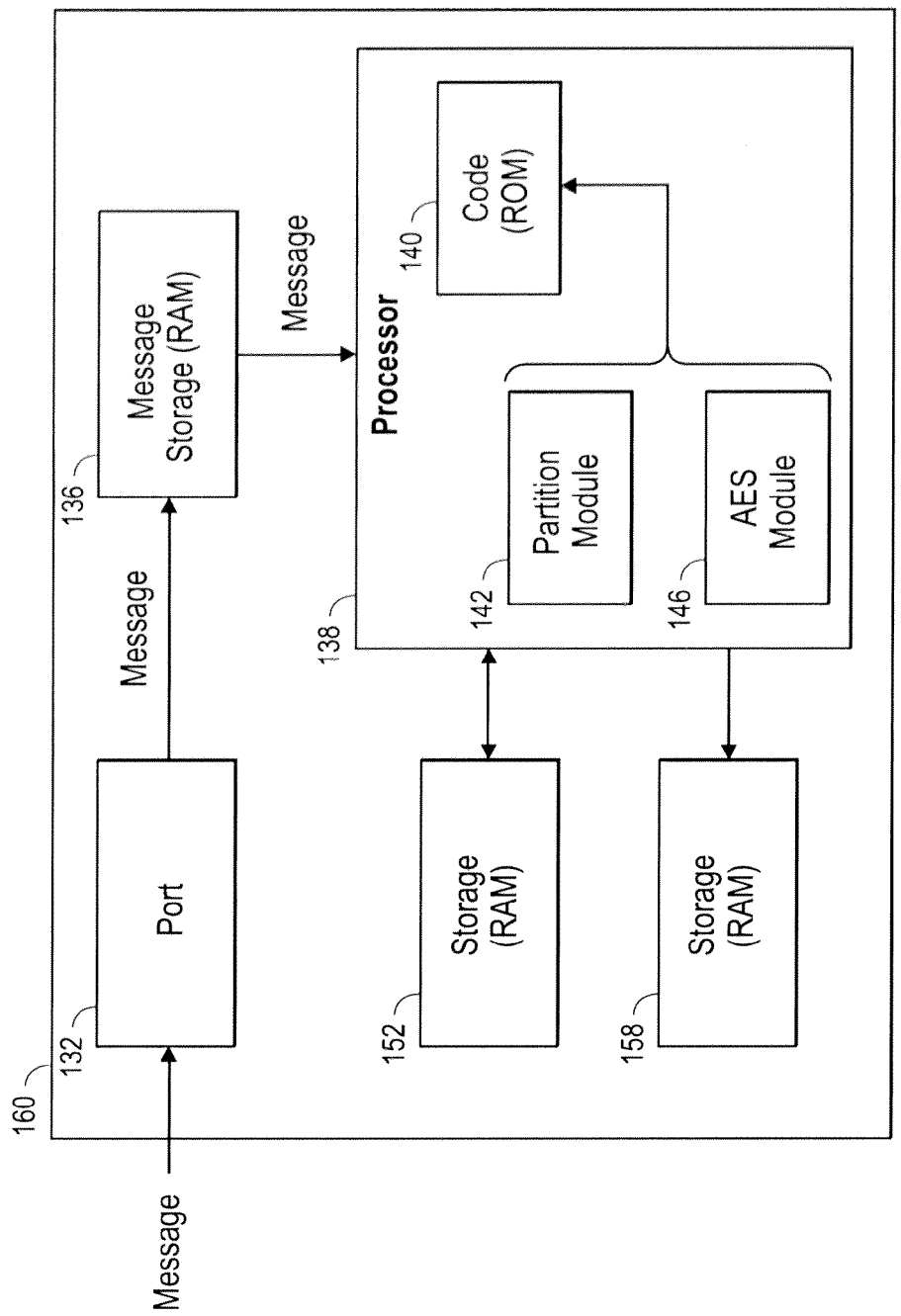
FIG. 3 shows a computing system in accordance with the invention.

FIG. 3 shows in a block diagram relevant portions of a computing device (system) 160 in accordance with the invention which carries out the cryptographic processes as described above. This is, e.g., a server platform, computer, mobile telephone, Smart Phone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity. Essentially a similar apparatus encrypts the message, and may indeed be part of the same platform.

The computer code is conventionally stored in code memory (computer readable storage medium) 140 (as object code or source code) associated with conventional processor 138 for execution by processor 138. The incoming ciphertext (or plaintext) message (in digital form) is received at port 132 and stored in computer readable storage (memory 136 where it is coupled to processor 138. Processor 138 conventionally then partitions the message into suitable sized blocks at partitioning module 142. Another software (code) module in processor 138 is the decryption (or encryption) module 146 which carries out the mostly conventional decryption or encryption functions which have been modified as set forth above including the above described modifications to the base cipher and chaining, with its associated computer readable storage (memory) 152.

Also coupled to processor 138 is a computer readable storage (memory) 158 for the resulting decrypted plaintext (or encrypted ciphertext) message. Storage locations 136, 140, 152, 158 may be in one or several conventional physical memory devices (such as semiconductor RAM or its variants or a hard disk drive). Electric signals conventionally are carried between the various elements of FIG. 6. Not shown in FIG. 3 is any subsequent conventional use of the resulting plaintext or ciphertext stored in storage 145.

Figure 4:
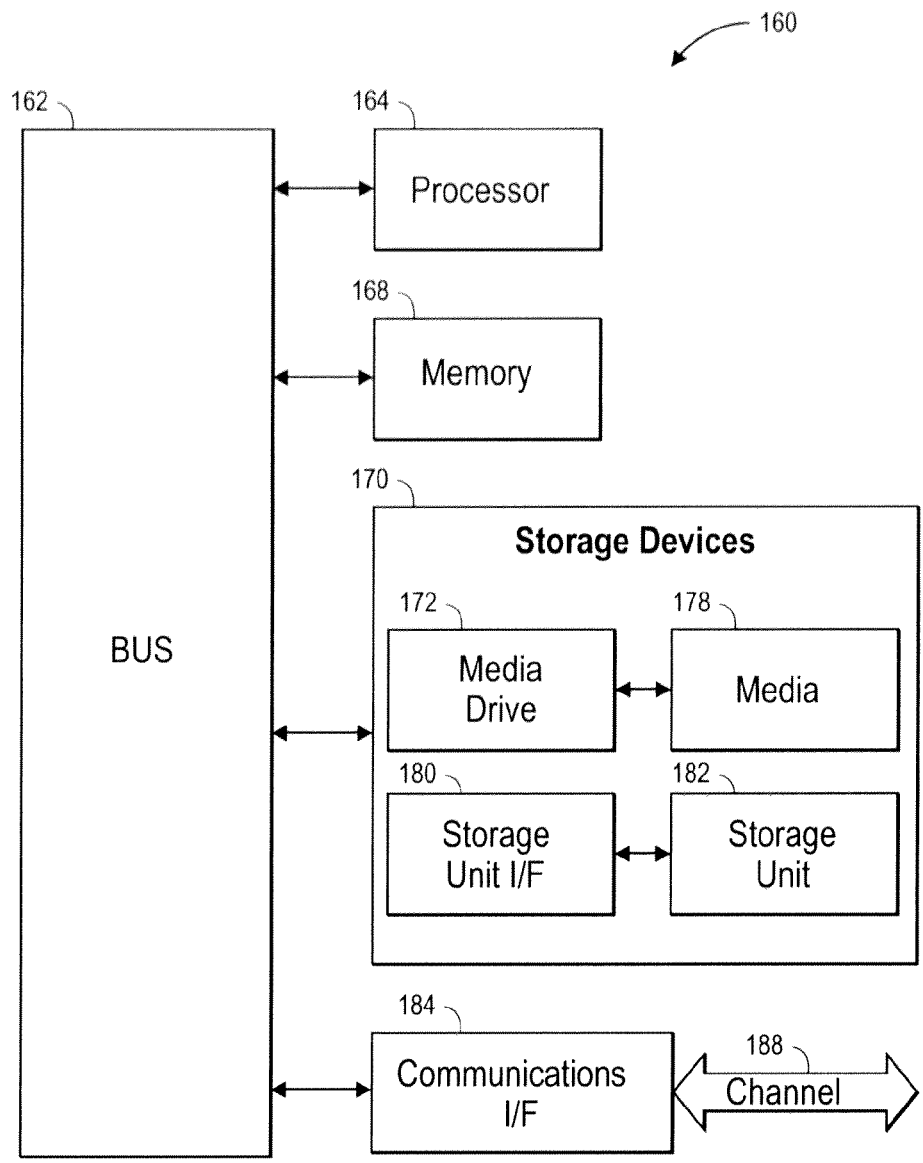
FIG. 4 shows a computing system as known in the art and used in accordance with the invention.

FIG. 4 illustrates detail of a typical and conventional embodiment of computing system 160 that may be employed to implement processing functionality in embodiments of the invention as indicated in FIG. 3 and includes corresponding elements. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 2). Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168 (equivalent of memories 136, 140, 152, and 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to part 132 in FIG. 3). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method, performed by a computing device comprising a processing system, of performing on a message a cryptographic process using a block cipher having a fixed block length and which includes a predetermined number of rounds, each round having an associated round key, each round including at least one cipher operation, the method comprising:

partitioning the message to define a plurality of first blocks of the fixed block length and a first remainder block;

applying the block cipher to each of the first blocks, to define a plurality of first processed blocks;

partitioning the message to define a plurality of second blocks of the fixed block length and a second remainder block, wherein the second remainder block is of the same size as the first remainder block, and wherein the second remainder block excludes the first remainder block, and wherein at least one of the plurality of second blocks includes the first remainder block; and applying the block cipher to each of the second blocks to define a plurality of second processed blocks;

wherein an effective block length of the cryptographic process is not equal to and not an integer multiple of the fixed block length.

2. The method of claim 1, wherein the cryptographic process is encryption or decryption and the message is respectively a cleartext or a ciphertext.

3. The method of claim 1, wherein the mode operation is cipher block chaining and further comprises:
logically combining an initialization value with each of the fixed length blocks.

4. The method of claim 1, wherein the cipher is the Advanced Encryption Standard (AES), Data Encryption Standard (DES) or triple DES cipher.

5. A non-transitory computer readable medium storing computer code comprising instructions, which when executed by a processing system performs a method comprising a cryptographic process on a message using a block cipher having a fixed block length and which includes a predetermined number of rounds, each round having an associated round key, each round including at least one cipher operation, the method comprising:
partitioning the message to define a plurality of first blocks of the fixed block length and a first remainder block;
applying the block cipher to each of the first blocks, to define a plurality of first processed blocks;
partitioning the message to define a plurality of second blocks of the fixed block length and a second remainder block, wherein the second remainder block is of the same size as the first remainder block, and wherein the second remainder block excludes the first remainder block, and wherein at least one of the plurality of second blocks includes the first remainder block; and
applying the block cipher to each of the second blocks to define a plurality of second processed blocks;
wherein an effective block length of the cryptographic process is not equal to and not an integer multiple of the fixed block length.

6. A computing apparatus comprising a processing system, the processing system including at least one processor and a memory component, the apparatus programmed to perform a cryptographic process on a message using a block cipher having a fixed block length and which includes a predetermined number of rounds, each round having an associated round key, each round including at least one cipher operation, the processing system, including the at least one processor and the memory component, configured to:
partition the message to define a plurality of first blocks of the fixed block length, and a first remainder block;
apply the block cipher to each of the first blocks to define a plurality of first processed blocks;
partition the message to define a plurality of second blocks of the fixed block length and a second remainder block, wherein the second remainder block is of the same size as the first remainder block, and wherein the second remainder block excludes the first remainder block, and wherein at least one of the plurality of second blocks includes the first remainder block; and
apply the block cipher to each of the second blocks to define a plurality of second processed blocks;
wherein an effective block length of the cryptographic process is not equal to and not an integer multiple of the fixed block length.

7. A method of performing on a message a cryptographic process using a standard block cipher having a fixed block length and which includes a predetermined number of rounds, each round having an associated round key, each round including at least one cipher operation, the method comprising:
receiving the message at a port;
storing the message in a first computer readable storage medium coupled to the port;
partitioning the message into blocks, a first block being of the fixed block length, a plurality of blocks being of a diminished block length less than the fixed block length, and a remainder having a length less than the diminished block length, without padding the message;
at a processor coupled to the first computer readable memory, applying the block cipher to the first block, to define a processed block;
arranging block boundaries of the processed block and a subsequent block of diminished length such that a block of the diminished length and a subsequent block of the fixed length are defined, wherein the block boundaries are modified to cause the arranging;
applying the block cipher to the subsequent block of the fixed length after the arranging to define a processed subsequent block;
iteratively, repeating the arranging and the applying for each of the blocks of diminished length, wherein in each iteration the processed subsequent block is considered as the processed block, and wherein an effective block length of the cryptographic process is not equal to and not an integer multiple of the fixed block length; and
storing each of the processed blocks in a second computer readable medium coupled to the processor.

8. The method of claim 7, further comprising rearranging an order of the block so the remainder is immediately before a last of the processed blocks.

9. The method of claim 7, further comprising applying a cipher operation mode to the stored result.

10. An apparatus, comprising a processing system, the processing system including at least one processor and a memory component, for performing on a message a cryptographic process using a standard block cipher having a fixed block length and which includes a predetermined number of rounds, each round having an associated round key, each round including a plurality of cipher operations, the processing system, including the at least one processor and the memory component, configured to:
receive the message at a port;
partition the message into blocks, a first block being of the fixed block length, a plurality of blocks being of a diminished block length less than the fixed block length, and a remainder having a length less than the diminished block length, without padding the message;
apply the block cipher to the first block, to define a processed block;
arrange block boundaries of the processed block and a subsequent block of diminished length such that a block of the diminished length and a subsequent block of the fixed length are defined, wherein the block boundaries are modified to cause the arrange;
apply the block cipher to the subsequent block of the fixed length after the arrange to define a processed subsequent block;
iteratively, repeat the arrange and the apply for each of the blocks of diminished length, wherein in each iteration the processed subsequent block is considered as the processed block, and wherein an effective block length of the cryptographic process is not equal to and not an integer multiple of the fixed block length; and
store each of the processed blocks to a computer readable medium coupled to the processor.

* * * * *